United States Patent [19]

Hager et al.

[11] 4,215,546

[45] Aug. 5, 1980

[54] HYDROSTATIC TRANSMISSION CONTROL SYSTEM

[75] Inventors: Aleksander Hager; Ryszard Zajaczkowski; Andrzej Adamowicz, all of Wroclaw, Poland

[73] Assignee: Kombinat Typowych Elementow Hydrauliki Silowej "Pszl-Hydral", Bierutowska, Poland

[21] Appl. No.: 936,916

[22] Filed: Aug. 24, 1978

[30] Foreign Application Priority Data

Aug. 27, 1977 [PL] Poland ............................. 200526

[51] Int. Cl.² ............................................. F15B 21/04
[52] U.S. Cl. ..................................... 60/456; 60/468; 60/470; 60/487; 417/440; 60/454
[58] Field of Search ............... 60/329, 453, 454, 456, 60/468, 487, 494, DIG. 5, 445, 451, 452, 470; 137/485, 488, 495, 596.12, 596.14; 417/440; 91/419, 461

[56] References Cited

U.S. PATENT DOCUMENTS

| 2,242,807 | 5/1941 | Austin | 60/454 X |
| 2,961,829 | 11/1960 | Weisenbach | 60/456 X |
| 3,174,410 | 3/1965 | Booth et al. | 60/329 X |
| 3,303,647 | 2/1967 | Futamata | 60/468 X |
| 3,391,537 | 7/1968 | Smith | 60/454 X |
| 3,393,509 | 7/1968 | Kempson | 60/465 |
| 3,399,531 | 9/1968 | Wright | 60/399 |
| 3,451,218 | 6/1969 | Grant | 60/487 |
| 3,905,194 | 9/1975 | Reimer | 60/449 |

Primary Examiner—Edgar W. Geoghegan
Attorney, Agent, or Firm—Haseltine, Lake & Waters

[57] ABSTRACT

A hydrostatic transmission control system including a variable displacement pump driving a constant displacement motor arranged in a hydraulic circuit having a controlled by-pass valve interconnected for positioning the pump swash plate in two established positions corresponding respectively to a stand still position or a full speed position of the motor. A thermosensitive element is coupled to the valve control spool for bypassing the flow of the pump in the event of motor jamming.

2 Claims, 2 Drawing Figures

HYDROSTATIC TRANSMISSION CONTROL SYSTEM

FIELD OF THE INVENTION

This invention relates to a hydrostatic transmission control system whose function is to assure two operational positions of the hydraulic motor. More particularly, the invention relates to a hydrostatic transmission control system to be applied on an aircraft to drive such devices as a spreader distributing chemicals or fertilizers over an area of land.

PRIOR ART

For this purpose it is a common practice to utilize a hydrostatic transmission including a constant delivery pump in hydraulic connection with a motor whose operation is controlled by periodically bypassing the pump delivery to a reservoir or by disconnecting a clutch installed between the pump and the power plant. Also known is a hydrostatic transmission control system in which the operational positions of the motor are obtained by a variable displacement pump having a swash plate positioned by auxiliary means and corresponding control valves. All of these additional elements have the disadvantages of involving energy losses and unduly complicating the system while also leading to increased size and weight.

SUMMARY OF THE INVENTION

The present invention eliminates the disadvantages noted above. It is an object of this invention to provide a simply hydrostatic transmission control system that closely resembles, in operation, a transmission which can be applied to a wide field of machines and devices acting periodically such as a spreader distributing chemicals or fertilizers from an aircraft over an area of land. A further object of this invention is to provide a hydrostatic transmission control system comprising means preventing an overheating of the fluid in the event of motor jamming or spreader stalling. The invention contemplates an open circuit comprising a hydraulic motor driven by a variable displacement pump having a servo control mechanism that displaces the swash plate between established positions, utilizing for this purpose the pump output pressure which is regulated by a control valve adapted for bypassing the output flow to the reservoir. The control valve is a pilot operated relief valve assembled with a two position control valve, interconnected in the circuit between the output line and return line to the reservoir. In a modification, the control valve has a spool coupled with a thermosensitive element placed in a space through which the by-passed fluid flows. If the temperature of the fluid exceeds a predetermined limit expansion of the thermosensitive element pushes the spool from the initial position thus causing the pump output to be by-passed to the reservoir.

BRIEF DESCRIPTION OF THE DRAWINGS

Other objects and advantages of the invention will become apparent upon reading the following detailed description with reference to the drawings, in which.

DETAILED DESCRIPTION OF THE INVENTION

While the invention will be described in connection with preferred embodiments, it will be understood that it is not intended to limit the invention to these embodiments. On the contrary, it is intended to cover all alternatives, modification and equivalents within the spirit and scope of the invention as defined by the appended claims.

Figure 1:
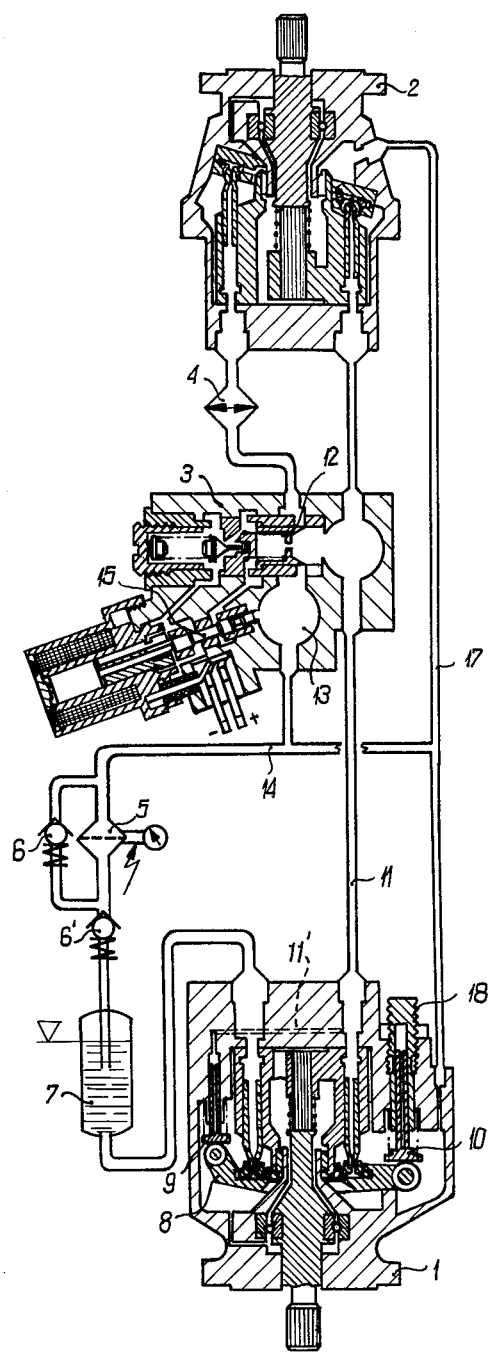
FIG. 1 is schematic view of the hydrostatic transmission control system, showing the motor at rest.
Figure 2:
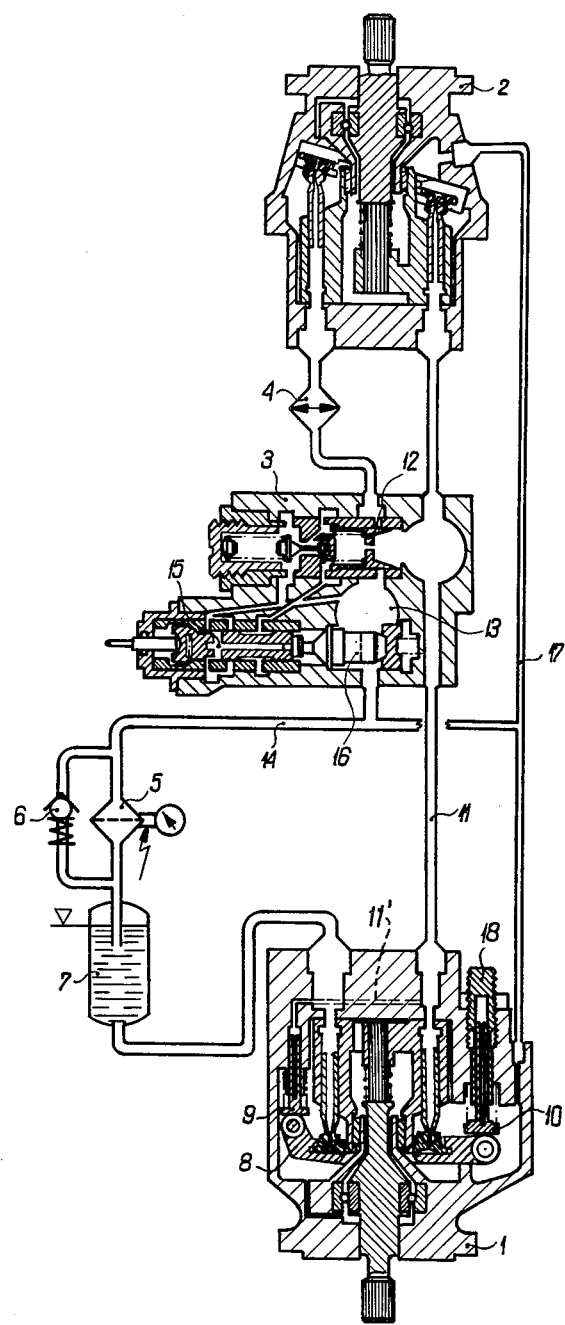
FIG. 2 illustrates a modification of the hydrostatic transmission in the FIG. 1, containing a mechanical by-pass valve coupled with a thermosensitive element.

According to FIG. 1 the hydrostatic transmission control system comprises a variable displacement pump 1, a constant displacement motor 2, a controlled by-pass valve 3, a cooler 4, a filter 5, check valves 6 and 6' and a reservoir 7. The pump 1 includes a swash plate 8 whose tilt angle determines the pump displacement. The swash plate 8 is positioned by a servo control mechanism having a servo piston 9 located in a cavity connected to a pump output line 11, and a spring-loaded pusher 10 that displaces the swash plate 8, responsive to the output pressure, to a stop position establishing a minimal inclination which corresponds to a socalled zero delivery condition, that is a delivery necessary to assure an adequate lubrication of the running parts, the excess fluid escaping to a drainage line 17. A spring on the servo piston 9 acts to take-up the clearance between the swash plate 8 and the pusher 10. The inlet of hydraulic motor 2 is connected to the pump output line 11 through the intermediary of controlled by-pass valve 3. The motor outlet is connected to cooler 4, valve 3, and the return line 14. The controlled by-pass valve 3 comprises a simple pilot relief valve 12 assembled with a two-position control valve 15 which is operated by a solenoid or mechanically. In the first or initial position, when the spool is at the left side, the space above the piston of the relief valve 12 is connected to the chamber 13 and therefrom to the return line 14, so that it is in a "floating" position. In the second position, when the spool is displaced to the right side, the space above the piston of the relief valve 12 is isolated from the return line 14 and the valve acts as a simple relief valve. In the path to the reservoir 7 is filter unit 5 comprising a clogging indicator and a check valve 6 for by-passing the flow in the event of a clogging. Check valve 6' prevents back flow from the reservoir 7. FIG. 2 shows a modification in which the spool 15 of the control valve is coupled to a thermosensitive element 16, placed in the flow path of the relief valve 12.

In operation, the transmission system is controlled as follows: by actuating the control valve 15, the spool is displaced to the right, so that the flow from the space over the piston of the relief valve 12 to the return line 14 is interrupted. The minimal output of the pump 1 is directed to the motor 2 whose starting resistance causes a pressure rise in the output line 11 and connecting line 11' to a value at which the servo piston 9 overcomes the spring force of the pusher 10 and displaces the swash plate to the maximal angular position established by a regulating bolt 18. Thus, the displacement and the output pressure increases to a value causing starting of the motor 2 and full speed operation thereof. Stoppage of the motor 2 is attained when the spool and the control valve 15 return to the initial position in which the space above the relief valve piston 12 is connected to the return line 14 and the output pressure line 11. The output pressure decreases to a value at which the spring force displaces the pusher 10 and puts the swash plate 8 in the zero delivery position so that the motor 2 comes to a stand still.

In the case of motor jamming, the output is vented through the relief valve 12 causing an overheating of the fluid in the circuit. Then the thermally sensitive element 16 expands and displaces the control valve spool 15, to the initial position in which the output pressure line 11 is connected with the return line 14 and thus the pump is adjusted to a zero delivery position.

What we claim is:

1. A hydrostatic transmission control system comprising:
   a. a variable displacement pump including an input line, an output pressure line, a swash plate and swash plate positioning means, said swash plate positioning means comprising a servo piston located in a cavity connected to said output pressure line, and a pusher having biasing means acting on said swash plate in response to the output pressure of the pump,
   b. a fluid motor driven by the output from the variable displacement pump, said motor including a return line;
   valve means controlling the output pressure of the variable displacement pump and thereby the swash plate positioning means, said valve means including a two-position control valve assembly with a pilot-actuated relief valve disposed between said output line and said return line from the motor, said swash plate positioning means being actuated by said biasing means to return to initial position of minimum pump output upon drop in said output pressure line produced by jamming of said motor and actuation of said control valve assembly;
   d. a cooler in said return line between the motor and said valve means;
   e. a reservoir connected to the return line of the motor and the input line of the pump; and
   f. a filter unit comprising a clogging indicator connected in said return line of the motor between said valve means and said reservoir, check valve means connected in said return line for bypassing the flow of fluid through said filter in the event of clogging of said filter and for blocking return of fluid from the reservoir.

2. A hydrostatic transmission control system as claimed in claim 1, wherein said valve means controlling the output pressure of the variable displacement pump comprises a thermosensitive element coupled to said control valve assembly and located in said return line downstream of the relief valve.

* * * * *